(12) United States Patent
Kung et al.

(10) Patent No.: US 8,630,604 B2
(45) Date of Patent: Jan. 14, 2014

(54) COMMUNICATION METHODS AND DEVICES FOR DUAL-MODE COMMUNICATION SYSTEMS

(75) Inventors: Hsiang Tsung Kung, Jhonghe (TW); Muhrong Yang, Taipei (TW)

(73) Assignee: Industrial Technology Research Institute, Hsinchu (TW)

( * ) Notice: Subject to any disclaimer, the term of this patent is extended or adjusted under 35 U.S.C. 154(b) by 997 days.

(21) Appl. No.: 11/882,776

(22) Filed: Aug. 6, 2007

(65) Prior Publication Data

US 2008/0212542 A1  Sep. 4, 2008

Related U.S. Application Data

(60) Provisional application No. 60/859,518, filed on Nov. 17, 2006.

(51) Int. Cl.
*H04W 4/00* (2009.01)

(52) U.S. Cl.
USPC .......................................................... 455/331

(58) Field of Classification Search
None
See application file for complete search history.

(56) References Cited

U.S. PATENT DOCUMENTS

| | | | |
|---|---|---|---|
| 7,003,310 B1 | 2/2006 | Youssefmir et al. | |
| 7,043,243 B2 | 5/2006 | Kobylinski et al. | |
| 7,542,728 B2 * | 6/2009 | Bitran et al. | 455/73 |
| 2002/0067707 A1 | 6/2002 | Morales et al. | |
| 2002/0132603 A1 * | 9/2002 | Lindskog et al. | 455/343 |
| 2005/0272425 A1 | 12/2005 | Amerga et al. | |
| 2006/0035639 A1 * | 2/2006 | Etemad et al. | 455/436 |
| 2007/0025297 A1 * | 2/2007 | Lee et al. | 370/331 |
| 2007/0230401 A1 * | 10/2007 | Rayzman et al. | 370/331 |
| 2008/0004024 A1 * | 1/2008 | Puri et al. | 455/436 |
| 2008/0117850 A1 * | 5/2008 | Agrawal et al. | 370/311 |
| 2009/0201860 A1 * | 8/2009 | Sherman et al. | 370/329 |
| 2009/0208013 A1 * | 8/2009 | Watanabe et al. | 380/272 |

FOREIGN PATENT DOCUMENTS

CN  1543751 A  11/2004

OTHER PUBLICATIONS

Author Unknown, IEEE P802.16e/D12 Draft, Part 16: Air Interface for Fixed and Mobile Broadband Wireless Access Systems, pp. 140-146 and 183-206.*
J. Kwak, WLAN Handoff Scenarios, IEEE 802.11 Submission, Mar. 2003, pp. 1-13.*
J. Kwak, Handoff Functional Elements, IEEE 802 Plenary Tutorial, Nov. 11, 2002.*

* cited by examiner

*Primary Examiner* — John Blanton
*Assistant Examiner* — Christopher Crutchfield
(74) *Attorney, Agent, or Firm* — Finnegan, Henderson, Farabow, Garrett & Dunner, LLP

(57) ABSTRACT

A method for wireless communication determines, for a client device having a first wireless connection with a first connection point, to initiate a second wireless connection between the client device and a second connection point, wherein the first connection point includes an Access Point and the second connection point includes a Base Station. The method sends a message from the second connection point to the first connection point, including instructions for the first connection point to communicate with the client device using either a Point Coordinate Function (PCF) or a Distributed Coordinate Function (DCF). In addition, the method initiates the second wireless connection between the client device and the second communication point.

11 Claims, 15 Drawing Sheets

FIG. 2a
*(PRIOR ART)*

| 2 (OCTET) | 2 | 6 | 6 | 6 | 2 | 6 | 0-2,312 | 4 |
|---|---|---|---|---|---|---|---|---|
| FRAME CONTROL | DURATION ID | ADDRESS 1 | ADDRESS 2 | ADDRESS 3 | SEQUENCE CONTROL | ADDRESS 4 | DATA | FCS |

FIG. 2b
*(PRIOR ART)*

| 2 (BITS) | 2 | 4 | 1 | 1 | 1 | 1 | 1 | 1 | 1 | 1 |
|---|---|---|---|---|---|---|---|---|---|---|
| VERSION | TYPE | SUBTYPE | TO DS | FROM DS | MF | RETRY | PWR | MORE | WEP | O |

COMMUNICATION METHODS AND DEVICES FOR DUAL-MODE COMMUNICATION SYSTEMS

PRIORITY

This application claims the benefit of priority of U.S. Provisional Application No. 60/859,518, filed Nov. 17, 2006, which is incorporated by reference herein in its entirety for any purpose.

TECHNICAL FIELD

The present disclosure relates generally to methods and devices for communication schemes and, more particularly, to methods and devices of dual-mode communication systems.

BACKGROUND

Wireless communication schemes allow wireless devices to communicate without the necessity of wired connections. Standards for wireless communication schemes are typically developed by organizations oriented toward a particular industry and then adopted within and/or across that industry. Standards may be developed and adopted in order to ensure, among other things, uniformity and interoperability within the industry, reduced development time, lower production costs, protection against obsolescence, and increased product quality and safety. Two such examples of wireless communication standards include Institute of Electrical and Electronics Engineers (IEEE) 802.11 and 802.16.

IEEE 802.11 includes the family of standards developed by the IEEE 802.11 committee, which established standards for Wireless Local Area Networks (WLAN). In part, the IEEE 802.11 family of standards defines methods of interoperability between wireless receivers and wireless transmitters. Wi-Fi™, a trademark of the Wi-Fi Alliance, is the term commonly used to refer to wireless communication and communication networks that are based on the IEEE 802.11 family of standards. As used herein, the term "Wi-Fi" will be used to refer to any communication network, system, apparatus, device, method, etc. that utilizes or is based on the 802.11 family of standards.

FIG. 1 is a block diagram of an exemplary Wi-Fi communication network. As shown in FIG. 1, an exemplary Wi-Fi network may include one or more transmitters, e.g., Access Points (AP) 110, including APs 110a, 110b, and 110c, one or more receivers, e.g., mobile subscriber stations (MSS) 120, including MSSs 120a, 120b, and 120c, and network 150.

The one or more APs 110 may be any type of communication device configured to transmit and/or receive communications based on the IEEE 802.11 family of standards, many of which are known in the art. In one exemplary embodiment, the one or more APs 110 may be connected to network 150. In addition, APs 110 may be configured to communicate with one or more MSSs 120 and other APs 110 using the communication protocols defined by the 802.11 family of standards. In one exemplary embodiment, one of APs 110 may serve as an intermediary between one or more MSSs 120 or other APs 110 and network 150. Network 150 may include, for example, any combination of one or more wide area networks (WAN), local area network (LAN), intranets, extranets, Internet, etc.

Each MSS 120 may be any type of computing device configured to transmit and/or receive data to and from APs 110 and/or other MSSs 120 using the communication protocols defined by the 802.11 family of standards. MSSs 120 may include, for example, servers, clients, mainframes, desktop computers, laptop computers, network computers, workstations, personal digital assistants (PDA), tablet PCs, scanners, telephony devices, pagers, cameras, musical devices, etc.

Each AP 110 may have a broadcast range within which AP 110 may communicate with one or more MSS 120 and other APs 110. Similarly, MSSs 120 may have a broadcast range within which MSS 120 may communicate with one or more other MSSs 120 and/or APs 110. Broadcast ranges may vary due to power levels, location, interference (physical, electrical, etc.). While the term "transmitter" is used to refer to AP 110 and the term "receiver" is used to refer to MSS 120, both AP 110 and MSS 120 may be configured to transmit and/or receive data.

The most commonly referenced amendments to the 802.11 family of standards include 802.11a, 802.11b, and 802.11g. 802.11a provides up to 54 Mbps transmission in the 5 GHz frequency band and uses an Orthogonal Frequency Division Multiplexing (OFDM) encoding scheme. 802.11b provides 11 Mbps transmission in the 2.4 GHz frequency band and uses Direct Sequence Spread Spectrum (DSSS) encoding. 802.11g provides up to 54 Mbps transmission in the 2.4 GHz frequency band and also uses OFDM encoding. In the United States and Canada, the allocated frequency for 802.11b/g is divided into 11 overlapping channels. Each channel is 22 MHz wide with a 5 MHz step to the next higher channel. While communication typically occurs in channels 1, 6, and 11 to avoid overlap, communication may occur within any of the channels.

The 802.11 family of standards requires the use of Distributed Coordinate Function (DCF), a form of Carrier Sense Multiple Access with Collision Avoidance (CSMA/CA), a contention-based protocol. Generally, when MSS 120 seeks to transmit using CSMA/CA, it must first listen to the channel for a predetermined amount of time to check for activity on the channel. If the channel is sensed "idle," MSS 120 may be permitted to transmit. If the channel is sensed "busy," MSS 120 may have to defer its transmission until such time as the channel is sensed "idle." In other words, in a Wi-Fi network, all MSSs 120 that seek to pass data to an AP 110 or another MSS 120 may compete for access on a random interrupt basis. This is commonly referred to as contention access.

As an optional access method, the 802.11 standard also defines the Point Coordinate Function (PCF). PCF is a contention-free access method that enables the transmission of time-sensitive information. With PCF, a point coordinator within AP 110 controls which MSSs 120 can transmit during any given period of time. For example, the point coordinator may first poll MSS 120a and, during a specified period of time, MSS 120a may transmit data. The point coordinator may then poll the next MSS 120 (e.g., MSS 120b) and, during a second specified period of time, MSS 120b may transmit data. The point coordinator may continue down the polling list, thereby allowing each MSS 120 connected to AP 110 a period of time during which it may send data.

AP 110 and MSS 120 may communicate by means of communication packets. These communication packets are called MAC "frames." FIG. 2a illustrates an exemplary MAC frame format defined by the 802.11 family of standards. As shown in FIG. 2a, the MAC frame format may include the following fields: Frame Control (i.e., control data for the frame), Duration ID (i.e., duration of frame for data frames, identity of transmitting station for control frames), Address 1 (i.e., source address), Address 2 (i.e., destination address), Address 3 (i.e., receiving station address), Address 4 (i.e., transmitting station address), Sequence Control (i.e., sequence number and fragment number), Data (i.e., variable length message body), and FCS (i.e., 32-bit Cyclic Redundancy Check (CRC) value).

FIG. 2b illustrates an exemplary MAC Frame Control field defined by the 802.11 family of standards. As shown in FIG. 2b, the Frame Control field may consist of a number of sub-fields: Version (i.e., 802.11 version in use), Type (e.g., management, control, or data frame type), Sub-type (e.g., authentication frame, de-authentication frame, association request frame, association response frame, re-association request frame, re-association response frame, disassociation frame, beacon frame, probe frame, probe request frame, probe response frame, etc.), To DS and From DS (i.e., combination of values to indicate the distribution system combination), More Fragments (MF) (i.e., indication of more frame fragments to follow), Retry (i.e., retransmission), Power Management (PWR) (e.g., power save, active mode, etc.), More (i.e., indication of more frames to follow), Wired Equivalent Privacy (WEP) (i.e., indication of WEP data processing), and Order (O) (i.e., position of the current frame relative to other frames).

FIG. 3 is a signaling diagram of an exemplary embodiment of communication between one MSS 120 and one or more APs 110. As shown in FIG. 3, MAC frames may be used to "handover" or transfer communication for MSS 120 (e.g., MSS 120b) between a serving AP 110, e.g., AP 110a, and a target AP 110, e.g., AP 110b. Serving AP 110a may be an AP 110 currently providing service or communication to MSS 120b, and target AP 110b may be an AP 110 with which MSS 120b seeks to establish communication.

Generally, handover may be accomplished in two phases—a discovery phase and a re-authentication phase. In the discovery phase, MSS 120b may send a probe request (i.e., a MAC frame in which the Type and Sub-Type fields are set to indicate a probe request) to find potential target APs 110. The probe request may be broadcast on all channels to all APs 110 within range. In response, all APs 110 within range may send a probe request response (i.e., a MAC frame in which the Type and Sub-Type fields are set to indicate a probe request response). For example, if AP 110b is within range, AP 110b may respond to MSS 120b with a probe request response.

Once MSS 120b has identified target AP 110b for handover, a re-authentication phase may begin. To begin re-authentication, MSS 120b may send a re-association request (i.e., a MAC frame in which the Type and Sub-Type fields are set to indicate a re-association request) to target AP 110b. Through the use of Inter-Access Point Protocol (IAPP), which is based on 802.11f, notification of the handover may be made to serving AP 110a as well as to the rest of the network by target AP 110b. For example, AP 110b may communicate to AP 110a by sending a security block. AP 110a may acknowledge the security block, and AP 110b may then send a move request. AP 110a may acknowledge the move request, updating data tables and sending a move response.

Once the network processing is complete, AP 110b may send a re-association response (i.e., a MAC frame in which the Type and Sub-Type fields are set to indicate a re-association response) to MSS 120b. Once the re-association response is received, MSS 120b may begin regular communication with AP 110b.

In this manner, wireless communication devices that operate according to the 802.11 family of standards, such as MSS 120b, may change physical locations yet maintain continuous communication with a network, such as network 150.

A second set of standards developed for wireless communication is IEEE 802.16. IEEE 802.16 includes the family of standards developed by the IEEE 802.16 committee, establishing standards for broadband wireless access. In part, the IEEE 802.16 family of standards defines the interoperability of broadband Wireless Metropolitan Area Networks (WirelessMAN). Generally speaking, WirelessMANs are typically large computer networks utilizing wireless infrastructure to form connections between subscriber stations. Wi-Max, a term defined and promoted by The Wi-Max Forum™, is commonly used to refer to WirelessMANs and wireless communication and communication networks that are based on the IEEE 802.16 standard. As used herein, the term "Wi-Max" will be used to refer to any communication network, system, apparatus, device, method, etc. that utilizes or is based on the 802.16 family of standards.

FIG. 4 is a block diagram of an exemplary Wi-Max network based on the 802.16 family of standards. As shown in FIG. 4, a Wi-Max network may include one or more transmitters, e.g., Base Stations (BS) 410, including BSs 410a, 410b, and 410c, one or more receivers, e.g., stationary subscriber stations (SS) 420, including SSs 420a and 420b, and mobile subscriber stations (MSS) 430, including MSSs 430a, 430b, and 430c.

The one or more BSs 410 may be any type of communication device configured to transmit and/or receive communications based on the IEEE 802.16 family of standards, many of which are known in the art. In one exemplary embodiment, the one or more BSs 410 may be connected to a network 450. In addition, BSs 410 may be configured to communicate with one or more SSs 420, MSSs 430, and/or other BSs 410 using the communication protocols defined by the 802.16 family of standards. In one exemplary embodiment, BS 410 may serve as an intermediary between one or more SSs 420, MSSs 430, or BSs 410 and a network 450. Network 450 may be wired, wireless, or any combination thereof. Network 450 may include, for example, any combination of one or more WANs, LANs, intranets, extranets, Internet, etc.

SS 420 and MSS 430 may include any type of wireless client device configured to communicate with BS 410 and/or other SSs 420 and MSSs 430 using the communication protocols defined by the 802.16 family of standards. Each SS 420 and MSS 430 may include, for example, servers, clients, mainframes, desktop computers, laptop computers, network computers, workstations, personal digital assistants (PDA), tablet PCs, scanners, telephony devices, pagers, cameras, musical devices, etc. In one exemplary embodiment, SS 420 may be a Wi-Fi AP enabled to communicate with BS 410 using the communication protocols defined by the 802.16 family of standards.

Each BS 410 may have a broadcast range within which that BS 410 may communicate with SS 420, MSS 430, and one or more other BSs 410. Broadcast ranges may vary due to power levels, location, interference (physical, electrical, etc.). Similarly, each SS 420 and MSS 430 may have broadcast ranges within which that SS 420 and MSS 430 may communicate with one or more other SSs 420, MSSs 430 and/or BSs 410. Broadcast ranges may vary due to power levels, location, interference (physical, electrical, etc.). While the term "transmitter" is used to refer to BS 410 and the term "receiver" is used to refer to SS 420 and MSS 430, any of BS 410, SS 420, and MSS 430 may be configured to transmit and/or receive data.

In addition to the ability of each BS 410 to connect and communicate with SS 420 and MSS 430, each BS 410 may also connect and communicate with one or more other BSs 410 using a line-of-sight, wireless link using the protocols and standards defined by 802.16 family of standards. In other words, a Wi-Max network may provide two forms of wireless communication: a point-to-point (P2P) communication (e.g., between BS 410a and BS 410b) that operates at frequencies up to 66 GHz, and a point-to-multipoint (P2MP) communication (e.g., between BS 410 and one or more SSs 420 and/or MSSs 430) that operates in the 2.0 to 11.0 GHz range. In one exemplary embodiment, P2MP communication may include so-called Mobile Wi-Max (e.g., communication between BS 410 and one or more MSSs 430) Mobile Wi-Max is based on IEEE 802.16e-2005 and may operate in the 2.3 GHz, 2.5 GHz, 3.3 GHz, and 3.4-3.8 GHz spectrum bands.

The 802.16 family of standards specifies a MAC layer Time Division Multiplex (TDM) downlink coupled with a Time Division Multiple Access (TDMA) uplink. The 802.16 family of standards may also support both Time Division Duplex (TDD) and Frequency Division Duplex (FDD) operational modes. TDD is a technique in which the system may transmit and receive within the same channel, assigning time slices for transmit and receive mode. FDD, in contrast, may require two separate spectrums.

Transmission time may be divided into variable length frames. In an FDD system, the uplink (e.g., SS to BS or MSS to BS) and downlink (e.g., BS to SS or BS to MSS) sub-frames may operate on separate uplink and downlink channels. In a TDD system, each frame may be divided into a downlink sub-frame and an uplink sub-frame operating on a single channel.

FIG. 5 illustrates an exemplary MAC frame format based on the 802.16 family of standards. As shown in FIG. 5, the MAC frame format may include a DL-MAP and a UL-MAP. The DL-MAP is a directory of the slot locations within the downlink sub-frame. The UL-MAP is a directory of slot locations within the uplink sub-frame. Through the DL-MAP and UL-MAP sub-frames, BS 410 may allocate access to the channel for both uplink and downlink communication.

In contrast to a Wi-Fi network, a Wi-Max network may use a scheduling algorithm by which subscriber stations (e.g., BS 410, SS 420, MSS 430, etc.) may compete only once for initial entry to the network (i.e., the communication network provided by a serving BS 410 to subscriber stations within range). Once initial entry into the network is accomplished, access slots may be allocated by BS 410. The access slot may be enlarged or contracted, but the access slot remains assigned to a specific subscriber station, thereby precluding the use of the access slot by other subscriber stations. Thus, the scheduling algorithm may allow BS 410 to balance the access slot assignments among the application needs of one or more subscriber stations.

BS 410, SS 420, MSS 430 may communicate with each other through the use of MAC frames. MAC frames may be used to "handover," or transfer communication, from a serving BS 410, e.g., BS 410a, to a target BS 410, e.g., BS 410b. A handover may occur when a subscriber station moves from within the broadcast range of one BS 410 to the broadcast range of another BS 410. Handovers may also occur when a BS 410 is disabled, suffers from a reduction in broadcast power, is removed from service, etc.

FIG. 6 is a signaling diagram of an exemplary handover between two BSs 410. When MSS 430 (e.g., MSS 430b) prepares to handover from a serving BS 410 (e.g., BS 410a) to a target BS 410 (e.g., BS 410b), serving BS 410a may transmit a Mobile Neighbor Advertisement (MOB_NBR_ADV) message to MSS 430b. Through the MOB_NBR_ADV message, MSS 430b may acquire information on one or more neighboring BSs 410. The MOB_NBR_ADV message may include a plurality of information elements (IEs), including, for example, a Management Message Type IE indicating a type of transmission message, an Operator ID IE indicating a network identifier, an N_NEIGHBORS IE indicating the number of neighbor BSs 410, a Neighbor BS-ID IE indicating IDs of neighboring BSs 410, a physical frequency IE indicating the channel frequency of neighboring BSs 410, and a TLV (Type, Length, Value) Encoded Neighbor Information IE providing other information related to the neighboring BSs 410.

MSS 430b may then transmit a Mobile Scanning Interval Allocation Request (MOB_SCN_REQ) message to the serving BS 410a. The MOB_SCN_REQ may be used by MSS 430b to initiate scanning of carrier-to-interference and noise ratios (CINRs) of pilot signals transmitted from neighboring BSs 410 and serving BS 410a. CINR scanning of pilot signals may be used to evaluate transmission power associated with the neighboring BSs 410 and serving BS 410a. The MOB_SCN_REQ message may include a plurality of IEs, such as, for example, a Management Message Type IE indicating a type of transmission message, a Scan Duration IE indicating a scan duration for which MSS 430b may scan CINRs of pilot signals received from neighboring BSs 410, and a Start Frame IE indicating a frame at which MSS 430b may start a scanning operation.

Upon receiving the MOB_SCN_REQ message, serving BS 410a may prepare and send a Mobile Scanning Interval Allocation Response (MOB_SCN_RSP) message to MSS 430b. The MOB_SCN_RSP message may include information which MSS 430b may use when scanning neighboring BSs 410, such as, for example, a Management Message Type IE indicating a type of transmission message, a Connection ID (CID) IE indicating a CID of the MSS that transmitted the MOB_SCN_REQ message (i.e., MSS 430b), a Scan Duration IE, and a Start Frame IE indicating a time at which a scanning operation may start. The Scan Duration may indicate a scanning duration for which the pilot CINR scanning is performed. In one exemplary embodiment, if the Scan Duration is set to "0" (Scan Duration=0), it may indicate that the scan request is rejected.

When MSS 430b receives the MOB_SCN_RSP message, MSS 430b may perform CINR scanning on the pilot signals received from serving BS 410a and any neighboring BSs 410. Based on the CINR scanning of the pilot signals, MSS 430b may determine if it should change from serving BS 410a to target BS 410b.

If MSS 430b makes a determination to change from serving BS 410a to target BS 410b, MSS 430b may transmit a Mobile Subscriber Station Handover Request (MOB_MSS-HO_REQ) message to serving BS 410a. The MOB_MSS-HO_REQ message may include a plurality of IEs, including, for example, a Management Message Type IE indicating a type of a transmission message and the scanning results acquired by the MSS 430b. In addition, the MOB_MSS-HO_REQ message may include the IDs of neighboring BSs 410, a service level that may be provided to the MSS 430b by the neighboring BSs 410, and an Estimated Handover Time (Estimated HO Time). Estimated HO Time may indicate the time at which the MSS 430b may select one of the neighboring BSs 410 as the target and begin handover. When serving BS 410a receives the MOB_MSSHO_REQ message transmitted by MSS 430b, serving BS 410a may detect a list of potential target BSs 410 to which the MSS 430b may be handed over.

Serving BS 410a may transmit a Mobile BS Handover Response (MOB_BSHO_RSP) message to MSS 430b in response to the MOB_MSSHO_REQ message. The MOB_BSHO_RSP message may include information on selected target BS 410b. The MOB_BSHO_RSP message may include a plurality of IEs, including, for example, a Management Message Type indicating a type of transmission message, Estimated HO Time, and information on potential target BSs 410. For example, the MOB_MSSHO_REQ message may include IDs for potential target BSs 410, and a predicted level of service that may be provided to MSS 430b by target BSs 410.

MSS 430b may then send a Mobile Handover Indication (MOB_HO_IND) message to serving BS 410a. The MOB_HO_IND message may include a plurality of IEs such as, for example, a Management Message Type IE indicating a type of transmission message, HO_IND_TYPE indicating whether the MSS 430b has accepted, rejected, canceled a handover to the selected target BS 410b, ID of selected target BS 410b, and HMAC tuple (i.e., Table Update Line Entry) used for authentication of the MOB_HO_IND message.

When serving BS 410a receives the MOB_HO_IND message indicating that MSS 430b has accepted the handover, serving BS 410a may release the connection to MSS 430b. Alternatively, serving BS 410a may retain the connection until it receives a report indicating completion of the handover to target BS 410b. After transmitting the MOB_HO_IND to serving BS 410a, MSS 430b may complete the remaining handover operation with target BS 410b.

In this manner, wireless communication devices that operate according to the 802.16 family of standards, such as MSS 430b, may change physical locations yet maintain continuous communication with a network, such as network 450.

As shown above, the adoption of standards such as 802.11 and 802.16 may ensure that a device configured to operate according to one standard can communicate with any other device also operating according to that same standard. However, with the increased use of mobile wireless computing devices, there has been an increased need to facilitate handovers, or transfer of communication, between communication networks utilizing differing communication standards, so-called dual-model systems. As shown in FIGS. 4 and 6, however, handover standards and procedures between serving AP 110a and target AP 110b, which operate based on the 802.11 family of standards, may differ significantly from handover standards and procedures between serving BS 410a and target BS 410b, which operate based on the 802.16 family of standards.

In addition, further issues may arise when there is mutual signal interference between networks operating according to differing communication standards. For example, as shown in FIG. 7, certain Wi-Fi networks may operate in the 2.4 GHz frequency band while certain Wi-Max networks may operate in the 2.5-2.69 GHz frequency band. Thus, when a wireless client device needs to process Wi-Fi and Wi-Max information simultaneously, such as during a handover, there may be mutual signal interference due to the proximity of the frequency bands and the differences in transmission and reception power. Thus, there is an increased need for systems and methods for avoiding signal interference in dual-mode systems.

The disclosed embodiments are directed to overcoming one or more of the problems set forth above.

SUMMARY OF THE INVENTION

In one aspect, the present disclosure is directed to a method for wireless communication. The method determines, for a client device having a first wireless connection with a first connection point, to initiate a second wireless connection between the client device and a second connection point, wherein the first connection point includes an Access Point and the second connection point includes a Base Station. The method sends a message from the second connection point to the first connection point, the message including instructions for the first connection point to communicate with the client device using either a Point Coordinate Function (PCF) or a Distributed Coordinate Function (DCF). In addition, the method initiates the second wireless connection between the client device and the second communication point.

In another aspect, the present disclosure is directed to a method for wireless communication. The method determines, for a client device having a first wireless connection with a first connection point, to initiate a second wireless connection between the client device and a second connection point, wherein the first connection point includes a Base Station and the second connection point includes an Access Point. The method sends a message from the second connection point to the first connection point, the message including instructions for scheduling the transmission and reception of client device data with the first connection point. In addition, the method initiates the second wireless connection between the client device and the second communication point.

In another aspect, the present disclosure is directed to a method for wireless communication. The method establishes a first wireless connection between a client device and a first connection point. The method determines to initiate a second wireless connection between the client device and a second connection point. In addition, the method sends a first message from the client device to the first connection point, wherein the first message includes a sleep request. The method receives a second message at the client device from the first connection point, wherein the second message includes a response to the sleep request. Further, the method initiates the second wireless connection between the client device and the second communication point.

In another aspect, the present disclosure is directed to a wireless communication station for wireless communication. The station includes at least one memory to store data and instructions and at least one processor configured to access the memory. The at least one processor is further configured to, when executing the instructions, determine to initiate a wireless connection between a client device and the wireless communication station, wherein the client device is currently connected with a wireless communication point. The at least one processor is further configured to send a message from the wireless communication station to the wireless communication point, wherein the message includes instructions for the wireless communication point to communicate with the client device using either a Point Coordinate Function (PCF) or a Distributed Coordinate Function (DCF). In addition, the processor is configured to initiate the wireless connection between the client device and the wireless communication station.

In another aspect, the present disclosure is directed to a wireless communication point for wireless communication. The wireless communication point includes at least one memory to store data and instructions and at least one processor configured to access the memory. The at least one processor is further configured to, when executing the instructions, determine to initiate a wireless connection between a client device and the wireless communication point, wherein the client device is currently connected with a wireless communication station. The at least one processor is further configured to send a message to the wireless communication station, wherein the message includes instructions requesting the wireless communication station to schedule client device data transmission and reception between the client device and the wireless communication station. In addition, the at least one processor is configured to initiate the wireless connection between the client device and the wireless communication point.

In another aspect, the present disclosure is directed to a wireless communication device for wireless communication. The device includes at least one memory to store data and instructions and at least one processor configured to access the memory. The at least one processor is further configured to, when executing the instructions, establish a first wireless connection between the wireless communication device and a first connection point. The at least one processor is also configured to determine to initiate a second wireless connection between the wireless communication device and a second connection point. In addition, the at least one processor is configured to send a first message to the first connection point, wherein the first message includes a sleep request, and process a second message at the wireless communication device received from the first connection point, wherein the second message includes a response to the sleep request. Further, the at least one processor is configured to initiate the second wireless connection between the wireless communication device and the second connection point.

BRIEF DESCRIPTION OF THE DRAWINGS

FIG. 2*a* illustrates an exemplary Wi-Fi MAC message format;

FIG. 2*b* illustrates an exemplary Wi-Fi MAC Frame Control format;

DETAILED DESCRIPTION

Figure 1:
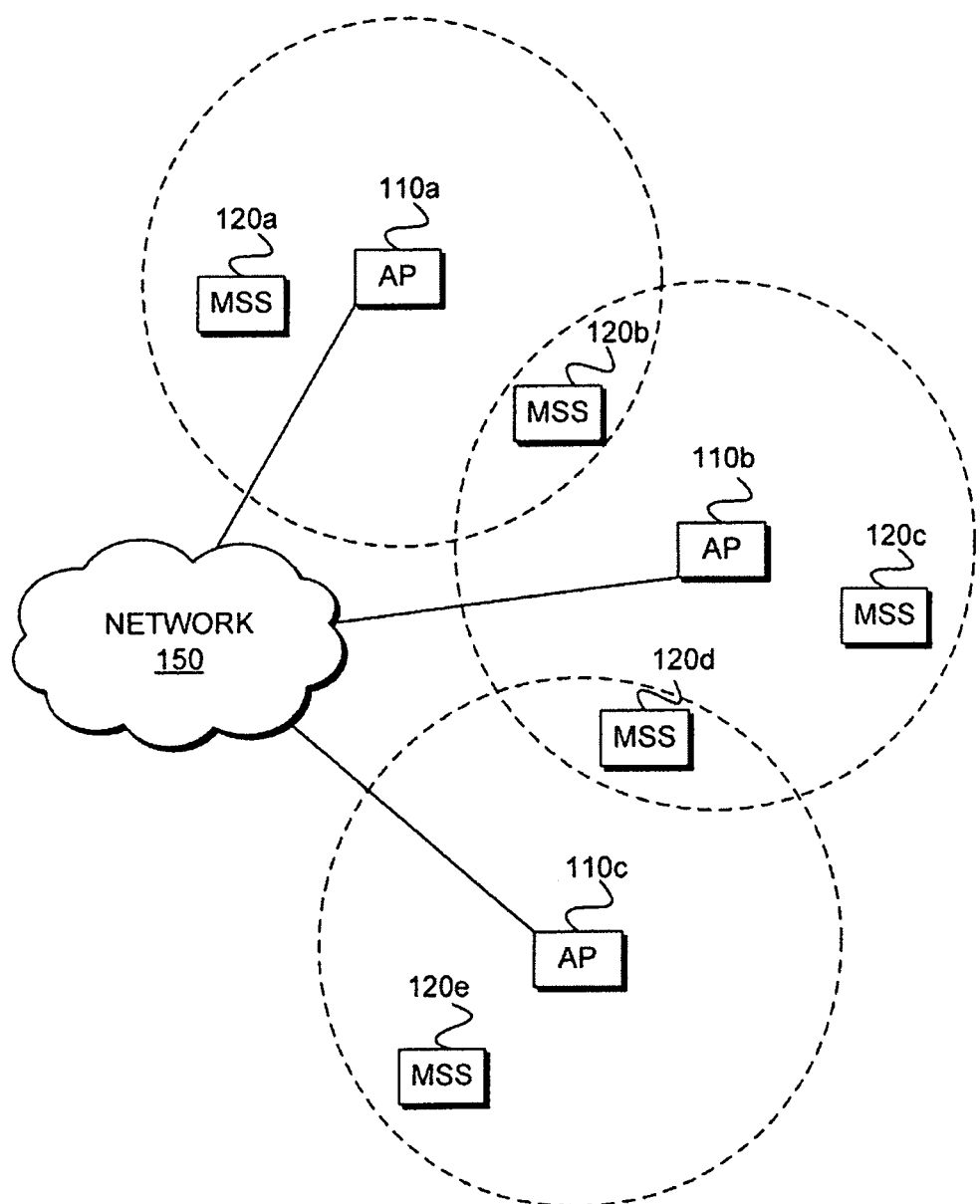
FIG. 1 is a block diagram of an exemplary Wi-Fi communication network.
Figure 3:
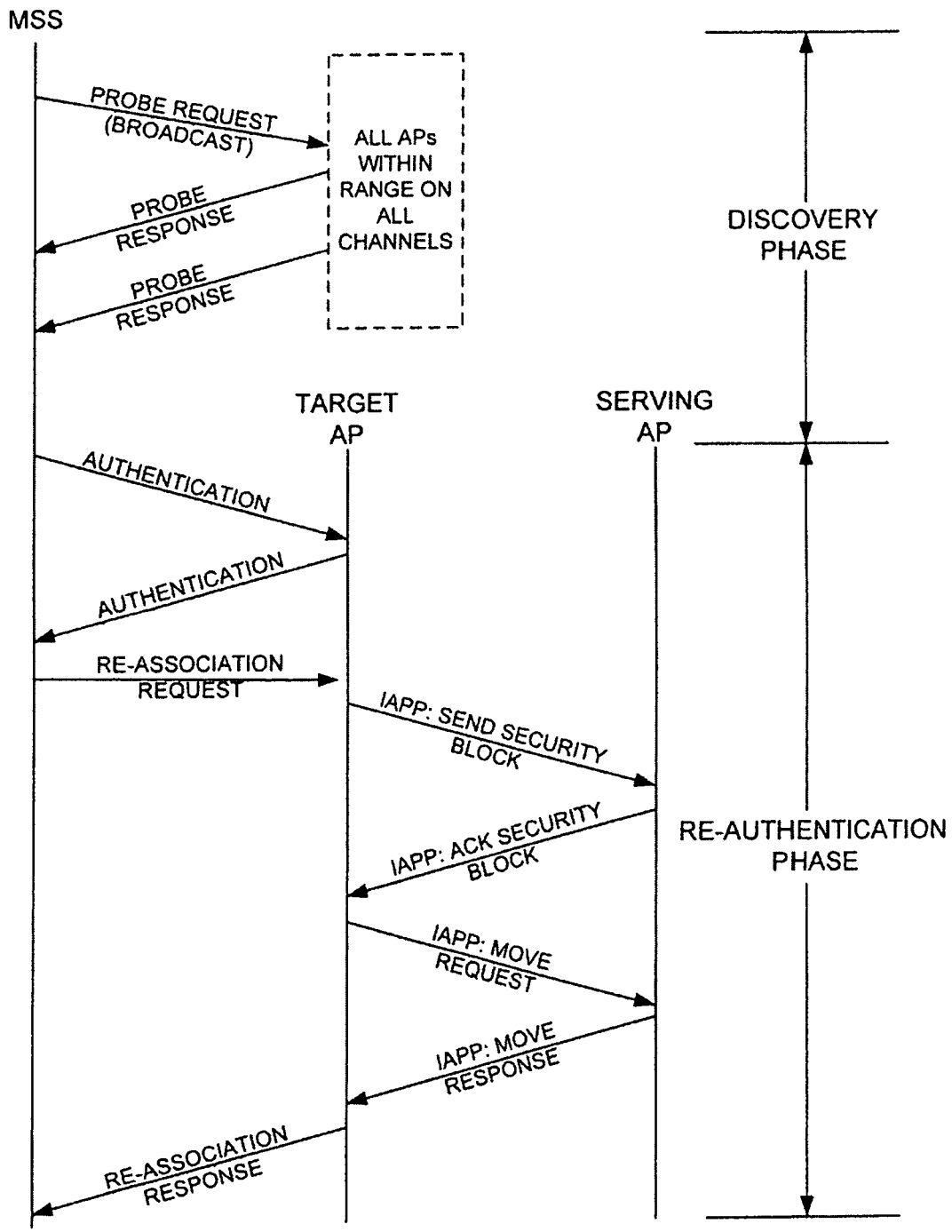
FIG. 3 is a signaling diagram of an exemplary message flow in a Wi-Fi network.
Figure 4:
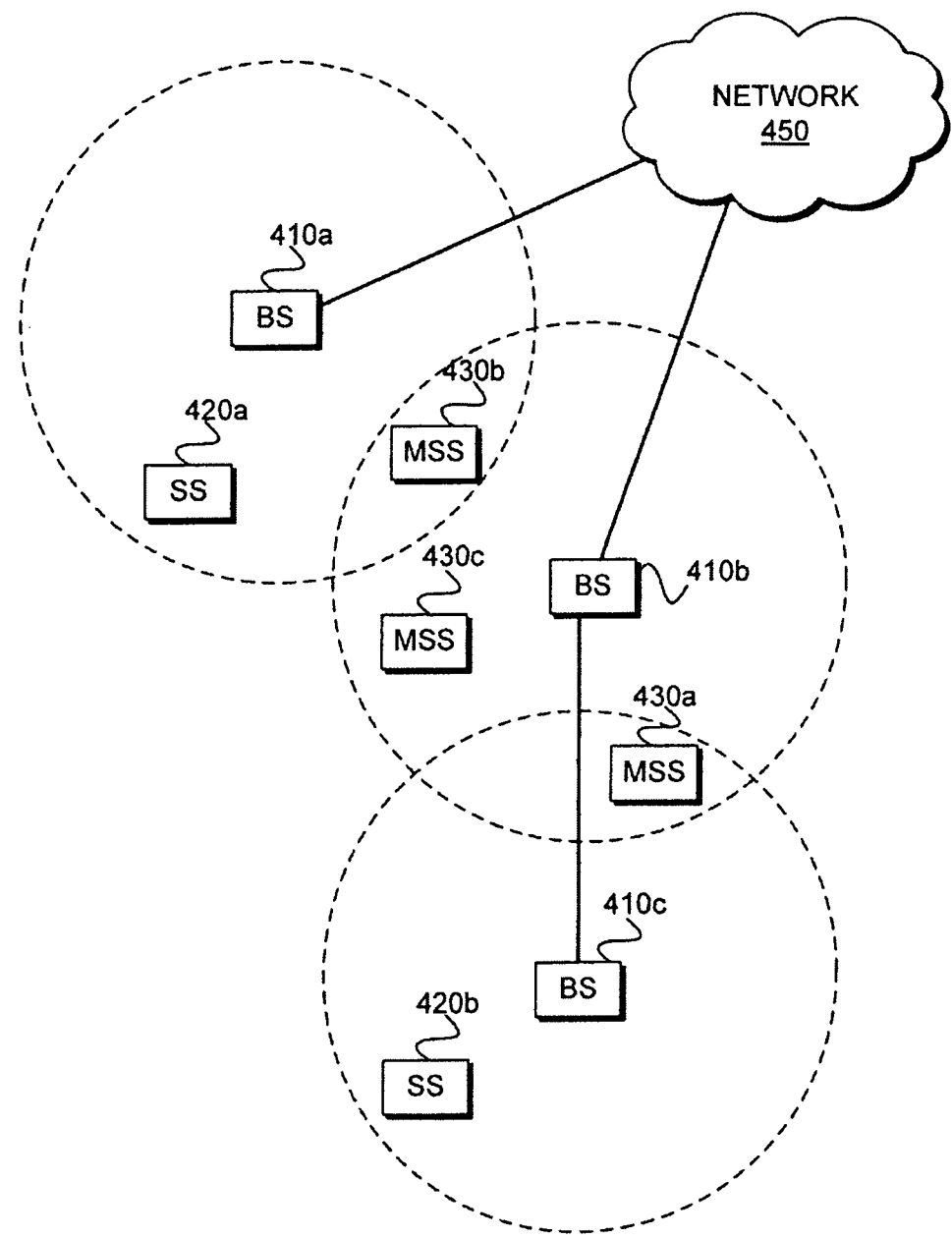
FIG. 4 is a block diagram of an exemplary Wi-Max network.
Figure 5:
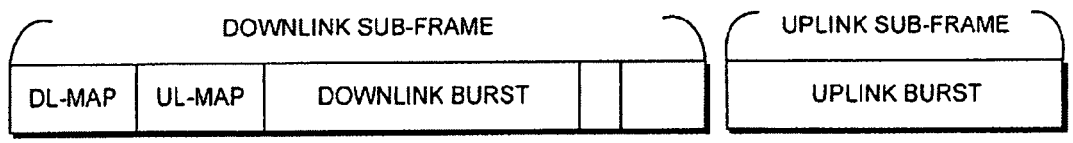
FIG. 5 illustrates an exemplary Wi-Max MAC message frame format.
Figure 6:
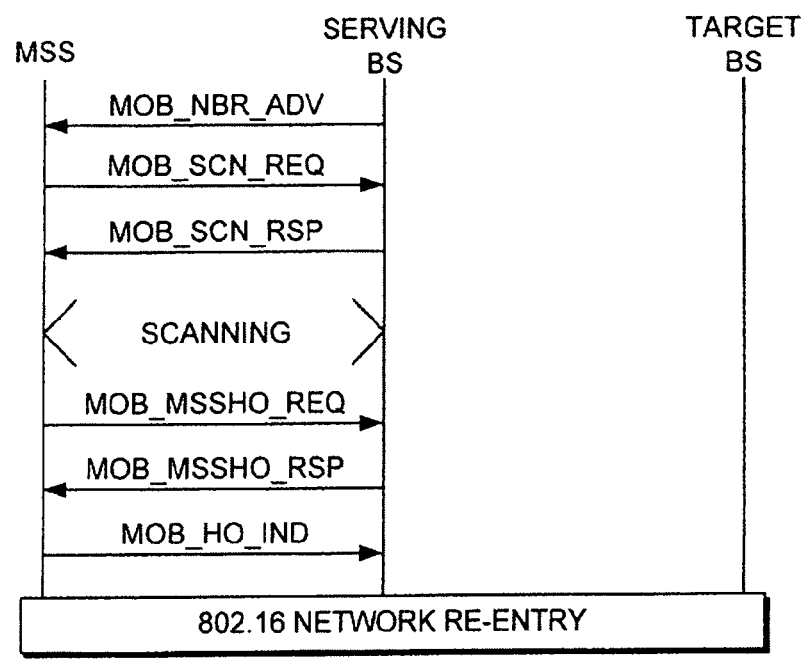
FIG. 6 is a signaling diagram of an exemplary message flow in a Wi-Max network.
Figure 7:
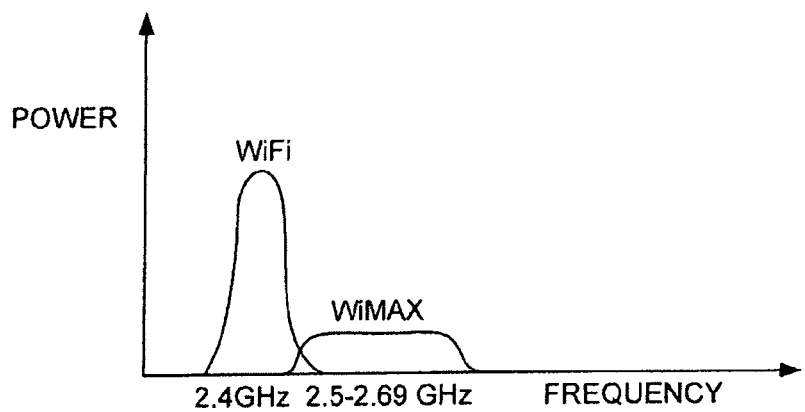
FIG. 7 is a graph of an exemplary power and frequency relationship between Wi-Max and Wi-Fi communication systems.
Figure 8:
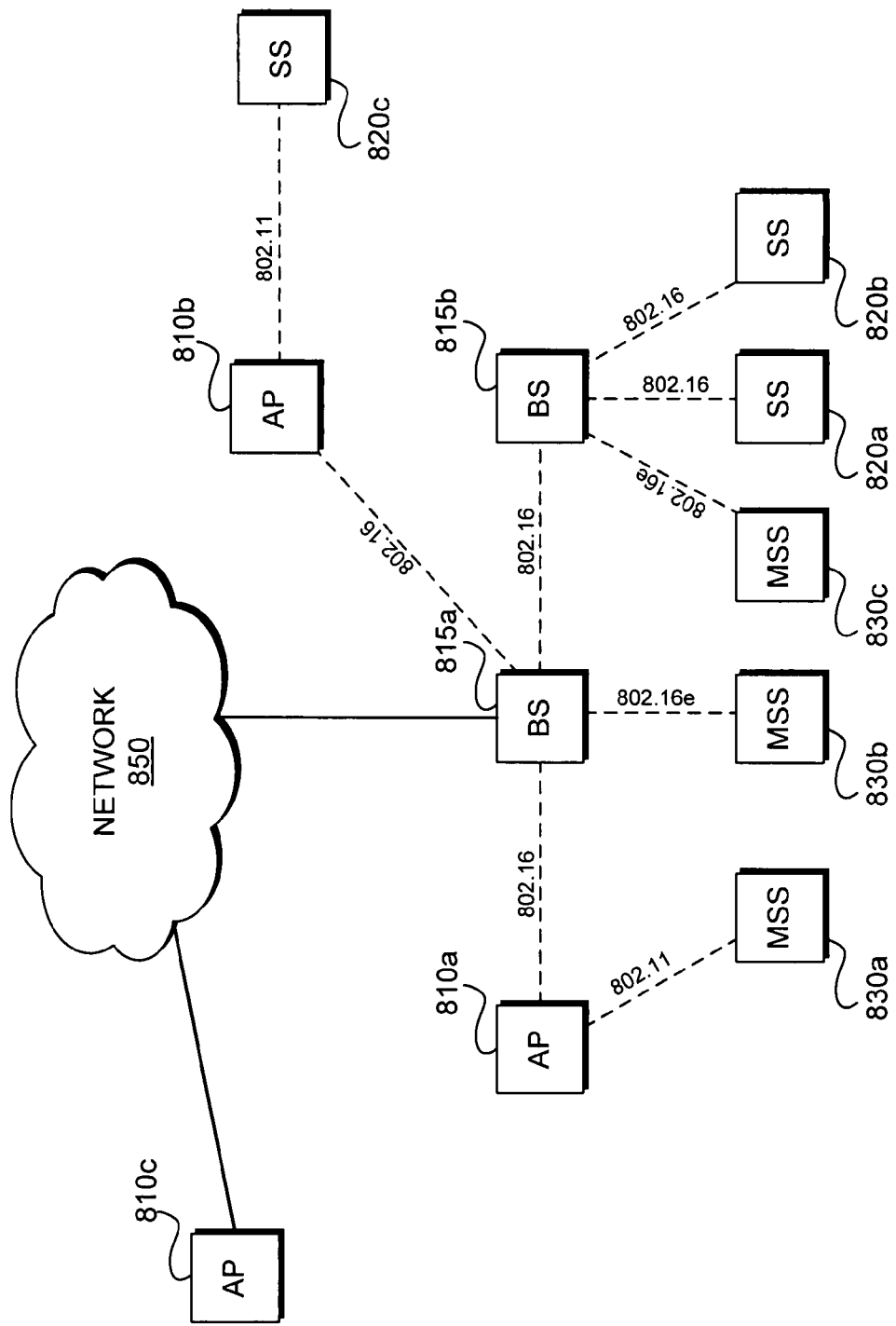
FIG. 8 illustrates an exemplary Wi-Fi/Wi-Max dual-mode communication system consistent with certain disclosed embodiments.

FIG. 8 illustrates an exemplary dual-mode system architecture in accordance with which systems and methods consistent with the disclosed embodiments may be implemented. As shown in FIG. 8, the system may include one or more Wi-Fi APs 810, including APs 810*a*, 810*b*, and 810*c*, one or more Wi-Max BSs 815, including BSs 815*a* and 815*b*, one or more SSs 820, including SSs 820*a*, 820*b*, and 820*c*, one or more MSSs 830, including MSSs 830*a*, 830*b*, and 830*c*, and network 850.

The one or more APs 810 may be any type of device configured to transmit and/or receive data based on the IEEE 802.11 family of standards, many of which are known in the art. In one exemplary embodiment, the one or more APs 810 may be connected by a wired connection to network 850. Alternatively and/or additionally, one or more APs 810 may communicate with BS 815 and thereby establish communication with network 850. Network 850 may include, for example, any combination of one or more WANs, LANs, intranets, extranets, Internet, etc.

The one or more BSs 815 may be any type of station configured to transmit and/or receive communications based on the IEEE 802.16 family of standards, many of which are also known in the art. In one exemplary embodiment, one or more BSs 815 may be connected by a wired connection to network 850. Alternatively and/or additionally, the one or more BSs 815 may be connected by a microwave radio connection to one or more other BSs 815. Each AP 810 and BS 815 may include one or more of the following components: a central processing unit (CPU) configured to execute computer program instructions to perform various processes and methods consistent with certain disclosed embodiments, random access memory (RAM) and read only memory (ROM) configured to access and store information and computer program instructions associated with the disclosed embodiments, a memory to store data and information, databases to store tables, lists, or other data structures, I/O devices, interfaces, antennas, etc. Each of these components is well-known in the art and will not be discussed further.

Each SS 820 may be any type of computing device configured to transmit and/or receive data to and from AP 810 and/or BS 815 by means of a wireless communication connection. Each SS 820 may include one or more of the following components: a central processing unit (CPU) configured to execute computer program instructions to perform various processes and methods consistent with certain disclosed embodiments, random access memory (RAM) and read only memory (ROM) configured to access and store information and computer program instructions associated with the disclosed embodiments, a memory to store data and information, databases to store tables, lists, or other data structures, I/O devices, interfaces, antennas, etc. Each of these components is well-known in the art and will not be discussed further. SS 820 may be configured to communicate according to either the 802.16 family of standards or 802.11 family of standards. In some embodiments, each SS 820 may be configured to communicate with one or more other SSs 820 or MSSs 830 by means of wired and/or wireless connections. SS 820 may include, for example, servers, clients, mainframes, desktop computers, laptop computers, network computers, workstations, personal digital assistants (PDA), tablet PCs, scanners, telephony devices, pagers, cameras, musical devices, and the like.

Each MSS 830 may be any type of computing device configured to transmit and/or receive data to and from AP 810 and/or BS 815 by means of a wireless communication connection. Each MSS 830 may include one or more of the following components: a central processing unit (CPU) configured to execute computer program instructions to perform various processes and methods consistent with certain disclosed embodiments, random access memory (RAM) and read only memory (ROM) configured to access and store information and computer program instructions associated with the disclosed embodiments, a memory to store data and information, databases to store tables, lists, or other data structures, I/O devices, interfaces, antennas, etc. Each of these components is well-known in the art and will not be discussed further. Each MSS 830 may be configured to communicate according to either the 802.16e standard or 802.11 family of standards. In addition, in some embodiments, each MSS 830 may be configured to communicate with one or more other SSs 820 or MSSs 830 by means of wired and/or wireless connections. In some embodiments, MSS 830 may be a mobile computing device. In other embodiments, MSS 830 may be a "non-mobile" computing device located in a mobile environment (e.g., airplanes, watercraft, buses, multi-passenger vehicles, automobiles, etc.). MSS 830 may include, for example, servers, clients, mainframes, desktop computers, laptop computers, network computers, workstations, personal digital assistants (PDA), tablet PCs, scanners, telephony devices, pagers, cameras, musical devices, and the like. For example, MSS 830 may be a server located in a bus.

As shown in FIG. 8, communication between BS 815a and BS 815b and communication between BS 815a and APs 810a and 810b may be based on the 802.16 family of standards. Similarly, communication between BS 815b and SSs 820a and 820b may also be based on the 802.16 family of standard. Communication between BS 815a and MSS 830b and between BS 815b and MSS 830c may be based on the 802.16e standard. Communication between AP 810a and MSS 830a and between AP 810b and SS 820c may be based on the 802.11 family of standards. Although not shown, communication between one or more SSs 820 and MSSs 830 may be based on either the 802.11 or the 802.16 families of standards, depending on the hardware and/or software configurations associated with SSs 820 and MSSs 830.

Figure 9A:
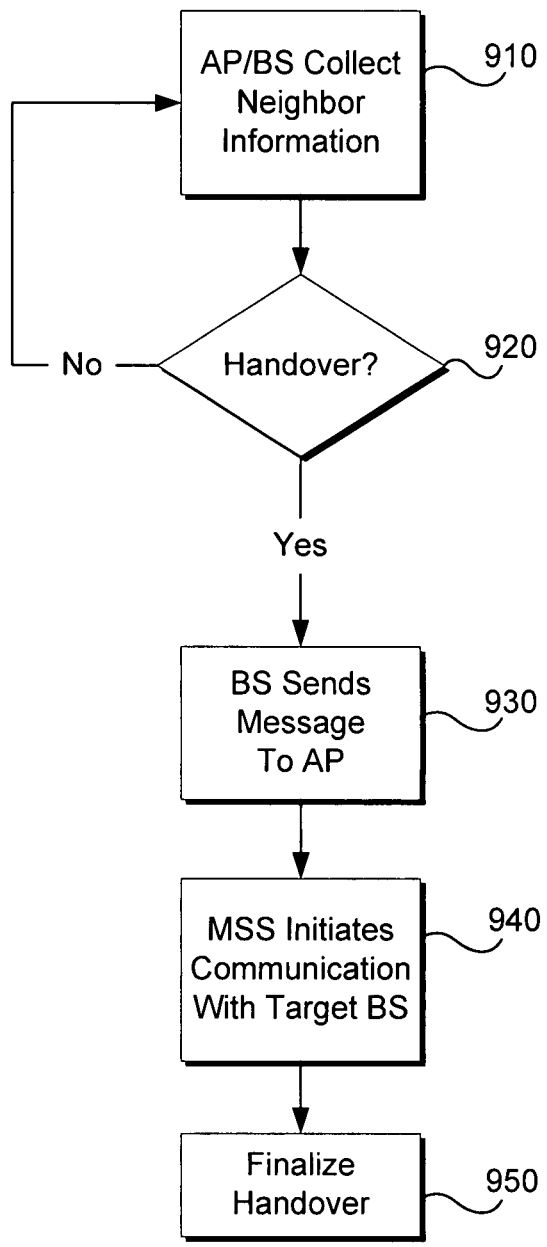
FIG. 9*a* is a flow chart illustrating an exemplary handover from a Wi-Fi network to a Wi-Max network, consistent with certain disclosed embodiments.
Figure 9B:
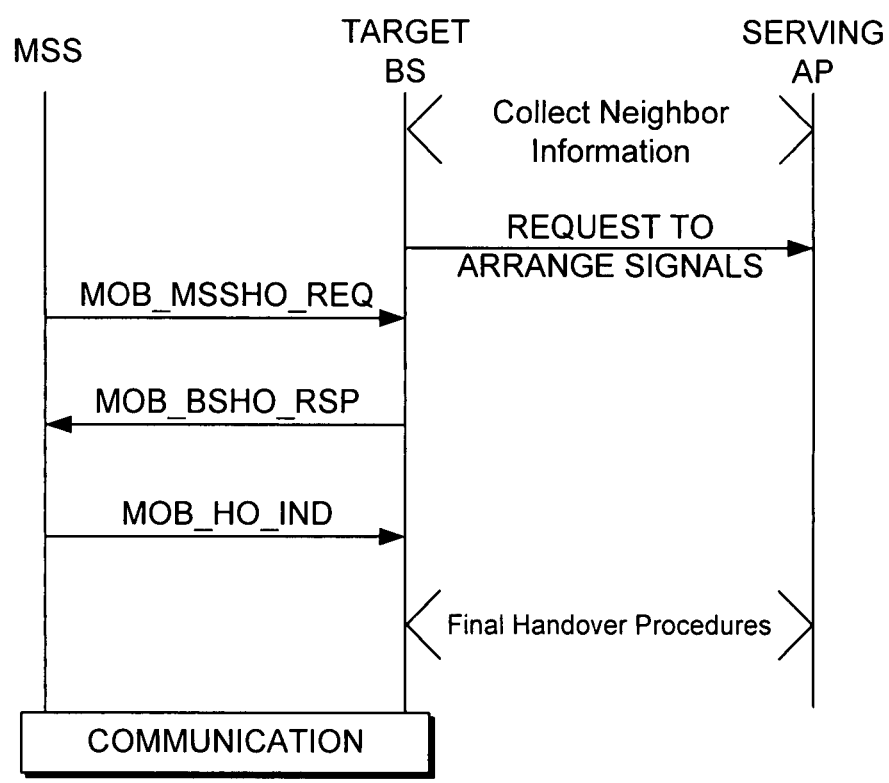
FIG. 9*b* is a signaling diagram of an exemplary exchange of data in a handover from a Wi-Fi network to a Wi-Max network, consistent with certain disclosed embodiments.

FIGS. 9a and 9b illustrate an exemplary process for a transfer of communication from AP 810 to BS 815 in which handover is initiated by AP 810 or BS 815. In other words, FIG. 9a illustrates an exemplary flowchart of a handover from a Wi-Fi network to a Wi-Max network. FIG. 9b is a signaling diagram of an exemplary exchange of data in a handover from a Wi-Fi network to a Wi-Max network. The process of FIGS. 9a and 9b may be performed by one or more components of AP 810, BS 815, SS 820, and MSS 830. For example, AP 810, BS 815, SS 820, and MSS 830 may execute one or more software programs that may perform one or more of the process steps of FIGS. 9a and 9b. In this illustration, communication may initially be established between MSS 830a and AP 810a, and either AP 810a or BS 815a may initiate a handover of MSS 830a from AP 810a to BS 815a.

Referring to FIG. 9a, AP 810a and BS 815a may periodically collect information regarding neighboring APs 810 and BSs 815 (step 910). The collection of neighboring information may be made by polling, probe requests, signal detection, etc. In one exemplary embodiment, TCP/IP routing packets may be exchanged by means of a wired communication network connecting APs 810 and BSs 815. For example, information may be obtained from TCP/IP routing packets exchanged between APs 810 and BSs 815, such as, for example, a number of hops, an IP segment, etc. A hop may be an intermediate connection (e.g., router, switch, hub, etc.) in a string of connections (e.g., router, switch, hub, etc.) linking two devices (e.g., AP 810a and BS 815b). Thus, for example, when there is one intermediate connection between AP 810 and BS 815, there may be only one hop, when there are two intermediate connections between AP 810 and BS 815, there may be two hops, and so on. When the number of hops is equal to or less than a predetermined number (e.g., one or two hops), it may be determined that the sending and receiving APs 810 and BSs 815 are neighbors. Alternatively and/or additionally, APs 810 and BSs 815 connected in the same IP segment may also be determined to be neighbors. In another exemplary embodiment, neighbor information may be stored in APs 810 and BSs 815 through a manual process at, for example, installation, initial setup, tear-down, upgrade, maintenance, etc. For example, neighboring information may be entered through a keyboard, copied or downloaded from a file, etc. The collected neighboring information may be stored by AP 810a and BS 815a in memory for later use.

Either AP 810a or BS 815a may determine that a handover of MSS 830a is to occur (step 920). The determination that a handover of MSS 830a is to occur may be made based on a Received Signal Strength Indication (RSSI) value. The RSSI may be a measurement of the received signal strength. In one exemplary embodiment, when the RSSI value is less than a predetermined threshold value, it may be determined that a handover of MSS 830a is to occur. Alternately and/or additionally, other signal measurements may also be used, such as, for example, Carrier to Interference Noise Ratio (CINR), Signal to Noise Ratio (SNR), etc. When the value of the signal measurement is, for example, greater than, less than, and/or equal to a predetermined threshold value, depending on the signal measurement used, it may be determined that a handover of MSS 830a is to occur.

When either AP 810a or BS 815a determines that a handover of MSS 830a is to occur (step 920, Yes), target BS 815a may send a message to serving AP 810a (step 930). In one exemplary embodiment, the message may include a request for AP 810a to arrange the reception and/or transmission signals of MSS 830a to PCF. As discussed above, PCF may be used to provide defined periods of time during which MSS 830a may transmit and receive data with AP 810a. In another exemplary embodiment, the message may include a request for AP 810a to arrange the reception and/or transmission signals of MSS 830a to DCF. If it is determined that handoff will not occur (step 920, No), AP 810a and BS 815a may continue to periodically collect information regarding neighboring APs 810 and BSs 815, as discussed above with respect to step 910.

During one or more blocks of idle time, MSS 830a may not send or receive signals to and from AP 810a. Thus, MSS 830a may initiate activation of BS 815a (step 940) without interference. Initiating activation of BS 815a may include transmission of an MOB_HO_IND message from MSS 830a to BS 815a. Once MSS 830a has sent the MOB_HO_IND message to BS 815a, MSS 830a may begin handover operations with BS 815a (step 950). In one exemplary embodiment, MSS 830a may adjust its operating frequency if BS 815a operates at a frequency different than that of AP 810a. In addition, MSS 830a may synchronize frames with BS 815a. Further, if handover is successful, AP 810a may release its connection with MSS 830*a* and either AP 810*a* or BS 815*a* may update the network to indicate that BS 815*a* is currently serving MSS 830*a*.

In this manner, wireless communication devices that operate according to the both the 802.11 and 802.16 families of standards, such as MSS 830*a*, may transfer communication from AP 810*a* to BS 815*a* while maintaining continuous communication with a network, such as network 850.

Figure 10A:
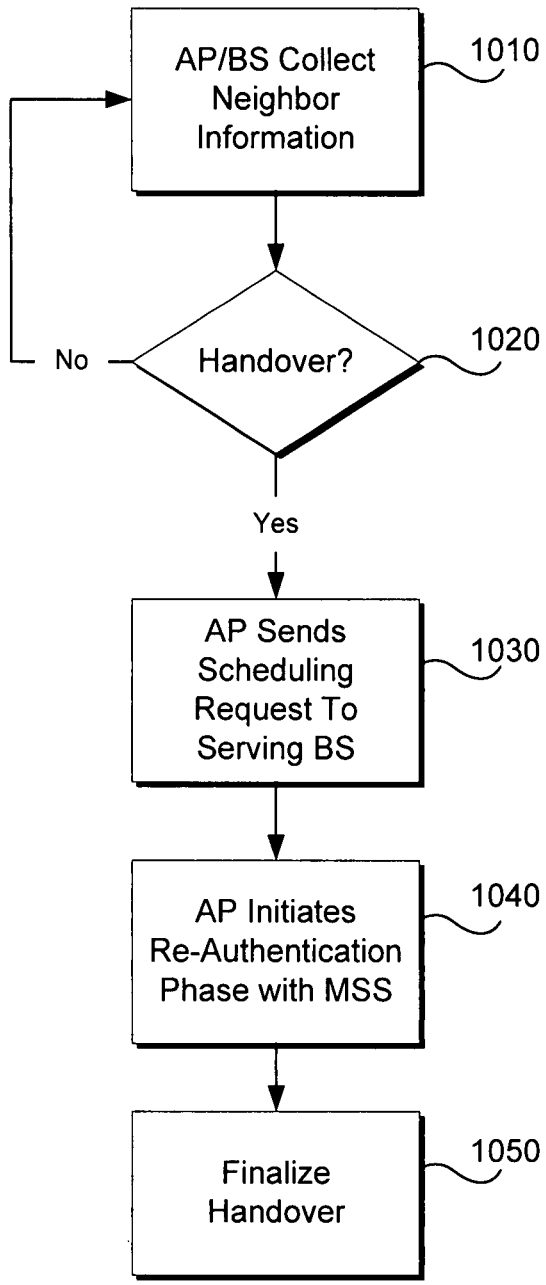
FIG. 10*a* is a flow chart illustrating an exemplary handover from a Wi-Max network to a Wi-Fi network, consistent with certain disclosed embodiments.
Figure 10B:
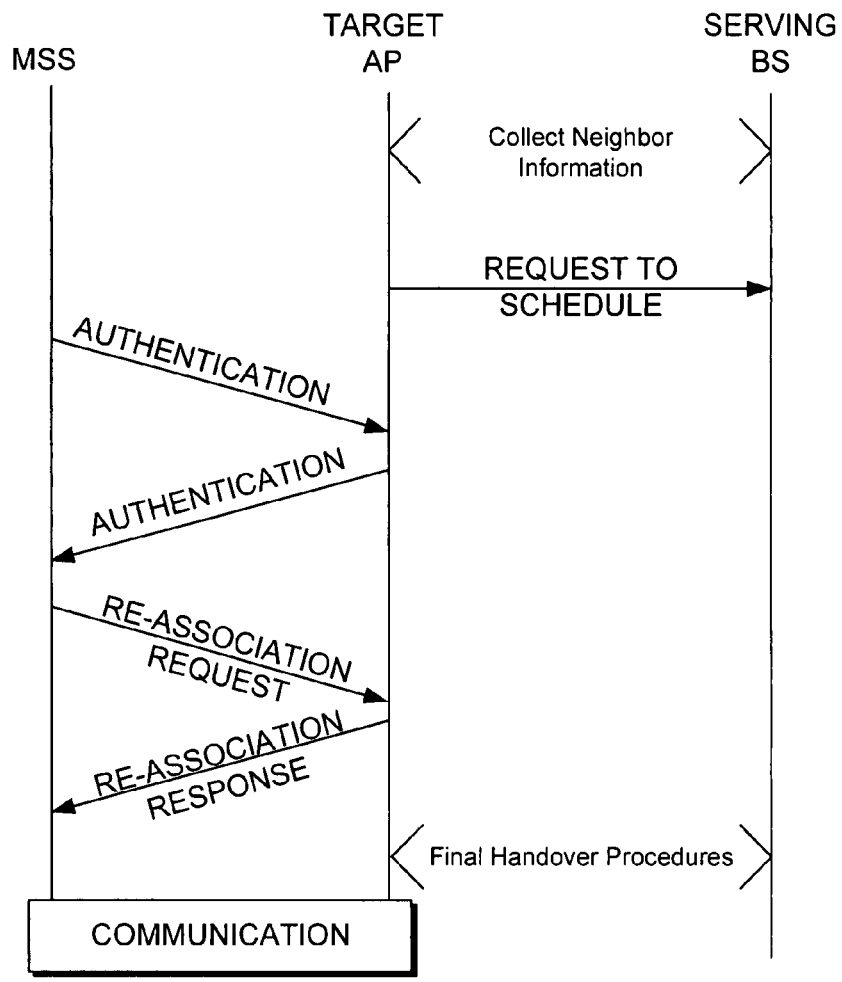
FIG. 10*b* is a signaling diagram of an exemplary exchange of data in a handover from a Wi-Max network to a Wi-Fi network, consistent with certain disclosed embodiments.

FIGS. 10*a* and 10*b* illustrate an exemplary process for a transfer of communication from BS 815 to AP 810 in which handover is initiated by AP 810 or BS 815. In other words, FIG. 10*a* illustrates an exemplary flowchart of a handover from a Wi-Max network to a Wi-Fi network. FIG. 10*b* is a signaling diagram of an exemplary exchange of data in a handover from a Wi-Max network to a Wi-Fi network. The process of FIGS. 10*a* and 10*b* may be performed by one or more components of AP 810, BS 815, SS 820, and MSS 830. For example, AP 810, BS 815, SS 820, and MSS 830 may execute one or more software programs that may perform one or more of the process steps of FIGS. 10*a* and 10*b*. In this illustration, communication is initially established between MSS 830*a* and BS 815*a*, and either AP 810*a* or BS 815*a* may initiate a handover of MSS 830*a* from BS 815*a* to AP 810*a*.

Referring to FIG. 10*a*, APs 810 and BSs 815 may periodically collect information regarding neighboring APs 810 and BSs 815 (step 1010). The collection of neighboring information may be made by polling, probe requests, signal detection, etc. In one exemplary embodiment, TCP/IP routing packets may be exchanged by means of a wired communication network connecting APs 810 and BSs 815. For example, information may be obtained from TCP/IP routing packets exchanged between APs 810 and BSs 815, such as, for example, a number of hops, an IP segment, etc. A hop may be an intermediate connection (e.g., router, switch, hub, etc.) in a string of connections (e.g., router, switch, hub, etc.) linking two devices (e.g., AP 810*a* and BS 815*b*). Thus, for example, when there is one intermediate connection between AP 810 and BS 815, there may be only one hop, when there are two intermediate connections between AP 810 and BS 815, there may be two hops, and so on. When the number of hops is equal to or less than a predetermined number (e.g., one or two hops), it may be determined that the sending and receiving APs 810 and BSs 815 are neighbors. Alternatively and/or additionally, APs 810 and BSs 815 connected in the same IP segment may also be determined to be neighbors. In another exemplary embodiment, neighbor information may be stored in APs 810 and BSs 815 through a manual process at, for example, installation, initial setup, tear-down, upgrade, maintenance, etc. For example, neighboring information may be entered through a keyboard, copied or downloaded from a file, etc. The collected neighboring information may be stored by AP 810*a* and BS 815*a* in memory for later use.

Either AP 810*a* or BS 815*a* may determine that a handover of MSS 830*a* is to occur (step 1020). The determination that a handover of MSS 830*a* is to occur may be made based on a Received Signal Strength Indication (RSSI) value. The RSSI may be a measurement of the received signal strength. In one exemplary embodiment, when the RSSI value is less than a predetermined threshold value, it may be determined that a handover of MSS 830*a* is to occur. Alternately and/or additionally, other signal measurements may also be used, such as, for example, Carrier to Interference Noise Ratio (CINR), Signal to Noise Ratio (SNR), etc. When the value of the signal measurement is, for example, greater than, less than, and/or equal to a predetermined threshold value, depending on the signal measurement used, it may be determined that a handover of MSS 830*a* is to occur.

When either AP 810*a* or BS 815*a* determines that a handover of MSS 830*a* is to be made (step 1020, Yes), target AP 810*a* may send a message to BS 815*a* (step 1030). The message may include a request for BS 815*a* to schedule the reception and/or transmission signals of MSS 830*a* after the UL-MAP. In addition, the message may request that uplink information be exchanged with MSS 820*a* for the next few frame periods. If it is determined that handover will not occur (step 1020, No), APs 810 and BSs 815 may continue to periodically collect information regarding neighboring APs 810 and BSs 815 (step 1010).

While transmission between MSS 830*a* and BS 815*a* is idle, MSS 830*a* may begin communicating with target AP 810*a* (step 1040). In particular, MSS 830*a* may enter a re-authentication phase with AP 815*a*. To begin re-authentication, MSS 830*a* may send a re-association request (i.e., a MAC frame in which the Type and Sub-Type fields are set to indicate a re-association request) to target AP 810*a*. In return, AP 810*a* may send a re-association response (i.e., a MAC frame in which the Type and Sub-Type fields are set to indicate a re-association response) to MSS 830*a*.

Once the re-authentication phase is complete, AP 810*a* may communicate with BS 815*a* to finalize handover procedures (step 1050). For example, MSS 830*a* may adjust its operating frequency if AP 810*a* operates at a different frequency than BS 815*a*, and MSS 830*a* may synchronize with AP 810*a*. In one exemplary embodiment, finalizing handover procedures may include sending a MOB_HO_IND message to BS 815*a*. Upon receipt of the MOB_HO_IND response, BS 815*a* may release the connection with MSS 830*a*, and either AP 810*a* or BS 815*a* may update the network to indicate that AP 810*a* is serving MSS 830*a*.

In this manner, wireless communication devices that operate according to both the 802.11 and 802.16 families of standards, such as MSS 830*a*, may transfer communication from BS 815*a* to AP 810*a* while maintaining continuous communication with a network, such as network 850.

Figure 11A:
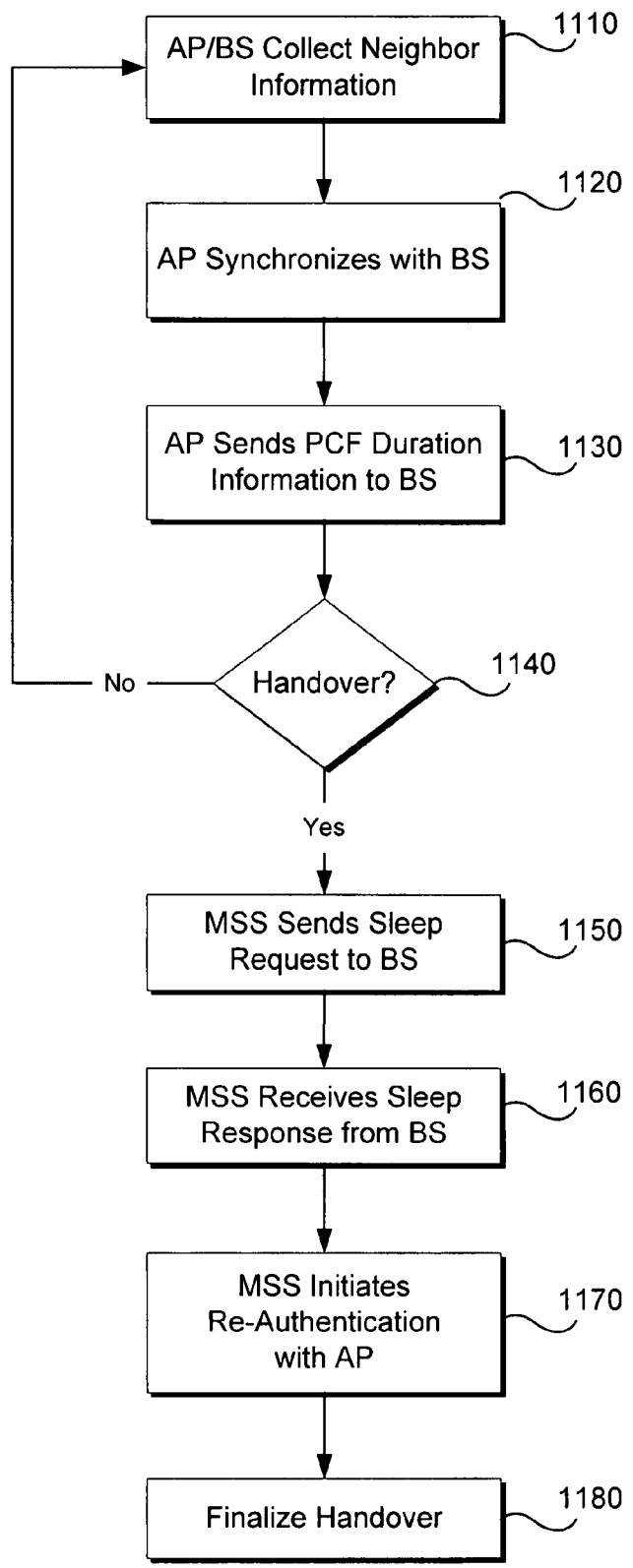
FIG. 11*a* is a flow chart illustrating an exemplary handover from a Wi-Max network to a Wi-Fi network, consistent with certain disclosed embodiments.
Figure 11B:
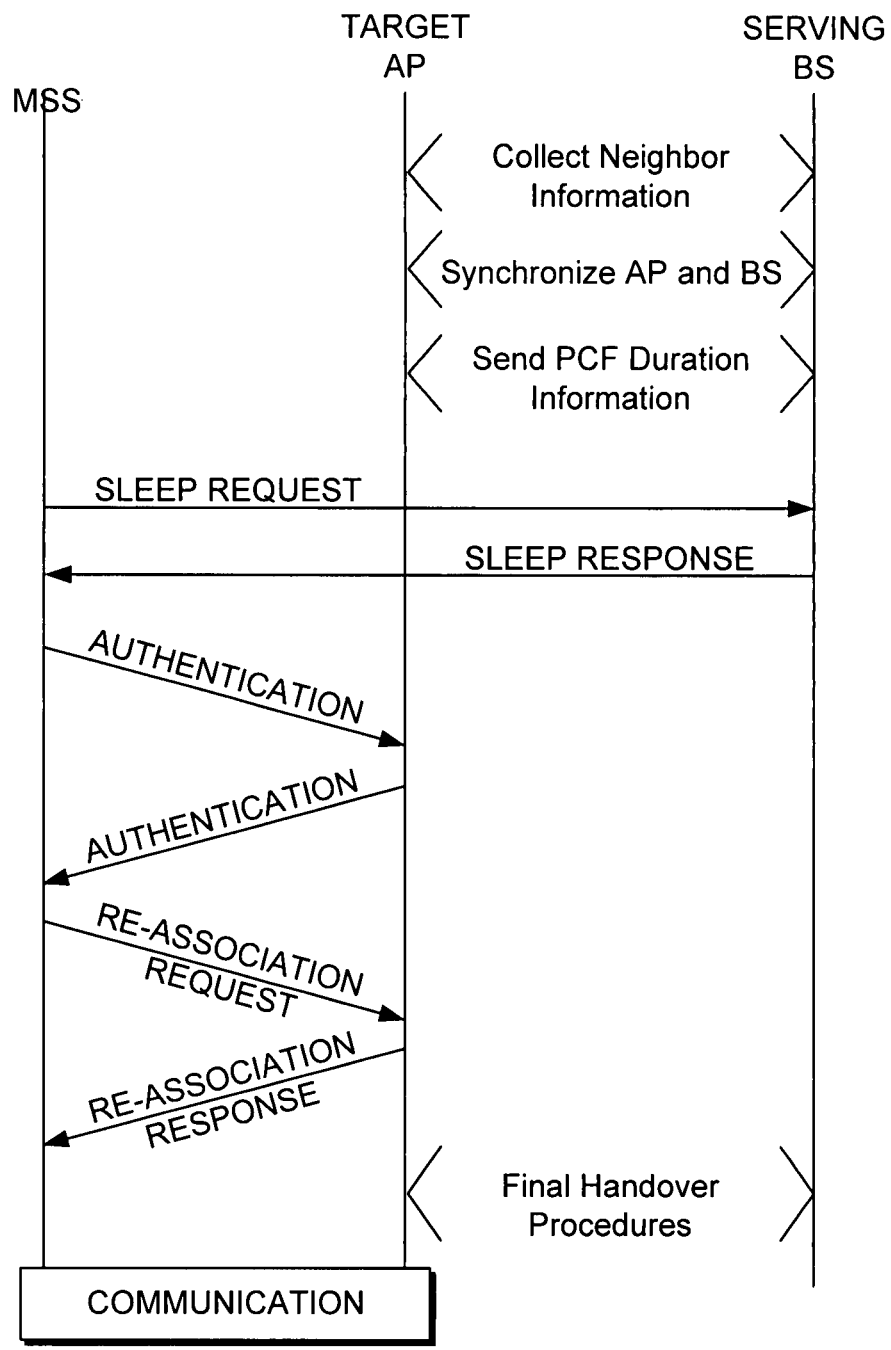
FIG. 11*b* is a signaling diagram of an exemplary exchange of data in a handover from a Wi-Max network to a Wi-Fi network, consistent with certain disclosed embodiments.
Figure 12:
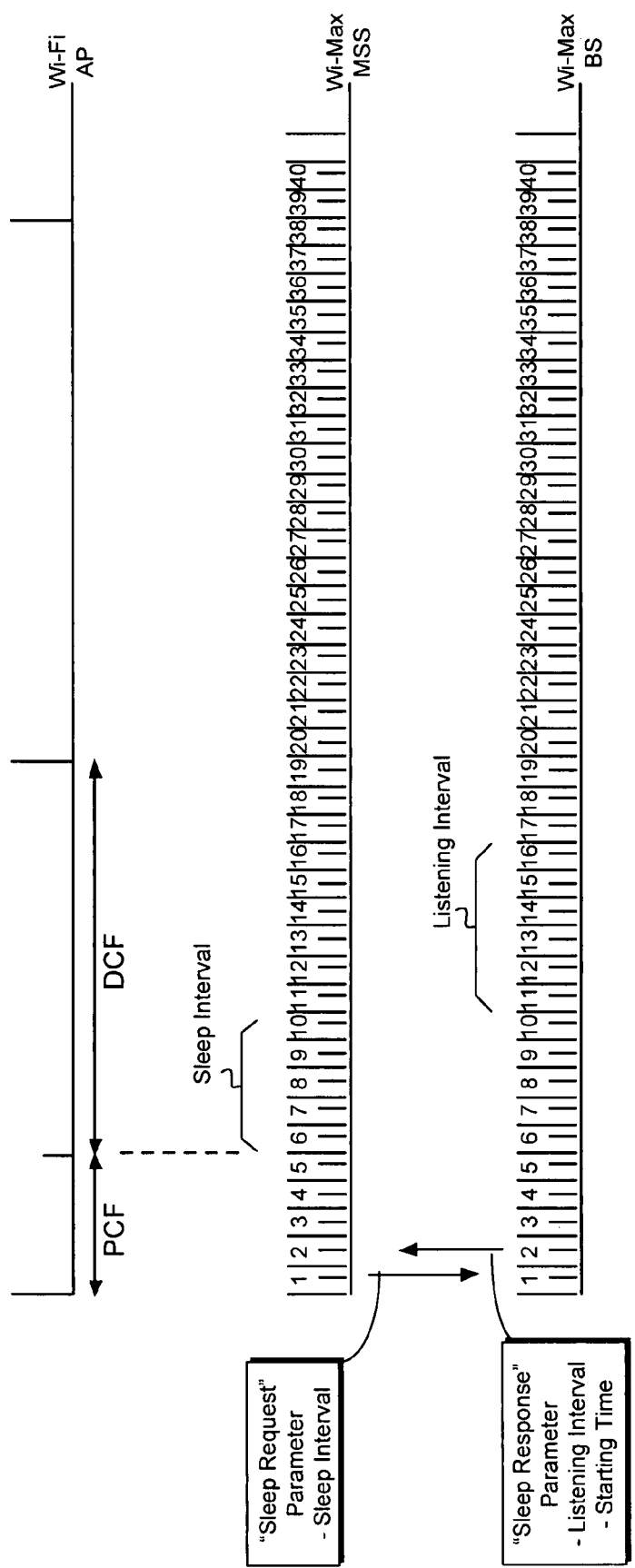
FIG. 12 is an exemplary timing diagram consistent with certain disclosed embodiments.

FIGS. 11*a*, 11*b*, and 12 illustrate an exemplary process for a transfer of communication from BS 815 to AP 810 in which handover is initiated by MSS 830. In other words, FIG. 11 a illustrates an exemplary flowchart of a handover from a Wi-Max network to a Wi-Fi network, FIG. 11*b* is a signaling diagram of an exemplary exchange of data in a handover from a Wi-Max network to a Wi-Fi network, and FIG. 12 illustrates an exemplary timing diagram of a handover from a Wi-Max network to a Wi-Fi network. The process of FIGS. 11*a*, 11*b*, and 12 may be performed by one or more components of AP 810, BS 815, SS 820, and MSS 830. For example, AP 810, BS 815, SS 820, and MSS 830 may execute one or more software programs that may perform one or more of the process steps of FIGS. 11*a*, 11*b*, and 12. In this illustration, communication is initially established between MSS 830*a* and BS 815*a*, and MSS 830*a* may initiate handover from BS 815*a* to AP 810*a*.

Referring to FIG. 11*a*, AP 810*a* and BS 815*a* may periodically collect information regarding neighboring APs 810 and BSs 815 (step 1110). The collection of neighboring information may be made by polling, probe requests, signal detection, etc. In one exemplary embodiment, TCP/IP routing packets may be exchanged by means of a wired communication network connecting APs 810 and BSs 815. For example, information may be obtained from TCP/IP routing packets exchanged between APs 810 and BSs 815, such as, for example, a number of hops, an IP segment, etc. A hop may be an intermediate connection (e.g., router, switch, hub, etc.) in a string of connections (e.g., router, switch, hub, etc.) linking two devices (e.g., AP 810*a* and BS 815*b*). Thus, for example, when there is one intermediate connection between AP 810 and BS 815, there may be only one hop, when there are two intermediate connections between AP 810 and BS 815, there may be two hops, and so on. When the number of hops is equal to or less than a predetermined number (e.g., one or two hops), it may be determined that the sending and receiving APs 810 and BSs 815 are neighbors. Alternatively and/or additionally, APs 810 and BSs 815 connected in the same IP segment may also be determined to be neighbors. In another exemplary embodiment, neighbor information may be stored in APs 810 and BSs 815 through a manual process at, for example, installation, initial setup, tear-down, upgrade, maintenance, etc. For example, neighboring information may be entered through a keyboard, copied or downloaded from a file, etc. The collected neighboring information may be stored by AP 810*a* and BS 815*a* in memory for later use.

In addition, AP 810*a* may periodically use Network Timing Protocol (NTP) to synchronize with BS 815*a* (step 1120). In one exemplary embodiment, this may include synchronizing the beacon frame start time of AP 810*a* with a downlink sub-frame start time of BS 815*a*. NTP is a protocol for synchronizing the clocks of computer systems, the details of which are well-known in the art and will not be discussed further.

AP 810*a* may also periodically send PCF and/or DCF duration information to BS 815*a* (step 1130). PCF and/or DCF duration information may be sent by means of a beacon frame (e.g., an 802.11 MAC frame in which the Type and Sub-Type fields are set to indicate a beacon frame). Each beacon frame may include a duration of the beacon frame and a duration of the PCF and/or DCF frame. In one exemplary embodiment, beacon frames may be broadcast by AP 810*a* and may be received by any AP 810 and/or BS 815 within a transmitting range. Alternatively and/or additionally, AP 810*a* may send beacon frames periodically to every BS 815 and AP 810 that has been determined to be a neighbor. In one exemplary embodiment, BS 815*a* may use the PCF and/or DCF duration information to coordinate a sleep interval, as is discussed in greater detail below.

MSS 830*a* may periodically evaluate communication with BS 815*a* to determine if handover should be made to target AP 810*a* (step 1140). The evaluation by MSS 830*a* may include, for example, a signal strength, a signal integrity, a signal frequency, or any other means known in the art. In one exemplary embodiment, MSS 830*a* may measure RSSI, CINR, and/or SNR of neighboring APs 810 and BSs 815. Neighboring APs 810 and BSs 815 may be determined using a database containing neighboring information received and stored by MSS 830*a*. When MSS 830*a* determines that the measured RSSI, CINR, and/or SNR value for the serving BS 815*a* is greater than, less than, and/or equal to a predetermined threshold value, depending on the signal measurement used, MSS 830*a* may send a handover request to serving BS 815*a*. For example, when MSS 830*a* determines that a measured RSSI value for BS 815*a* is less than a predetermined threshold value, MSS 830*a* may send a handover request to serving BS 815*a*. In one exemplary embodiment, the handover request may include a priority list of APs 810. The priority list of APs 810 may be based on the measured signal values and/or neighboring information stored by MSS 830*a*. If it is determined that handoff will not occur (step 1140, No), APs 810 and BSs 815 may continue periodic collection, synchronization, and communication as discussed with respect to steps 1110, 1120, and 1130.

If MSS 830*a* makes a determination to commence handover from BS 815*a* to AP 810*a* (Step 1140, Yes), MSS 830*a* may send a message to BS 815*a* (step 1150), as shown in FIG. 12. The message may include, for example, a "sleep request."

In one exemplary embodiment, the "sleep request" may be a MOB_SLP-REQ message and the MOB_SLP_REQ message may specify a sleep interval, start frame of the sleep interval, power saving class, etc. In response, BS 815*a* may send a message to MSS 830*a* to confirm the action (step 1160), as also shown in FIG. 12. In one exemplary embodiment, the message may include, for example, a "sleep response." In one exemplary embodiment, the "sleep response" may be a MOB_SLP-RES message and the MOB_SLP-RES message may specify a listening interval, start frame of the listening interval, power saving class, etc. As discussed above, the sleep interval, listening interval, start frame of the sleeping interval, and start frame of the listening interval may be synchronized between AP 810*a* and BS 815*a* using the NTP information.

Once the sleep interval begins, MSS 830*a* may enter the re-authentication phase with AP 810*a* (step 1170). To begin re-authentication, MSS 830*a* may send a re-association request (i.e., a MAC frame in which the Type and Sub-Type fields are set to indicate a re-association request) to target AP 810*a*. In return, AP 810*a* may send a re-association response (i.e., a MAC frame in which the Type and Sub-Type fields are set to indicate a re-association response) to MSS 830*a*.

Once the re-authentication phase is complete, AP 810*a* may communicate with BS 815*a* to finalize handover procedures (step 1180). For example, MSS 830*a* may adjust its operating frequency if AP 810*a* operates at a frequency from that of BS 815*a*, and MSS 830*a* may synchronize with AP 810*a*. In one exemplary embodiment, finalizing handover procedures may include sending a MOB_HO_IND message to BS 815*a*. Upon receipt of the MOB_HO_IND response, BS 815*a* may release the connection with MSS 830*a*, and either AP 810*a* or BS 815*a* may update the network to indicate that AP 810*a* is serving MSS 830*a*.

In this manner, wireless communication devices that operate according to both the 802.11 and 802.16 families of standards, such as MSS 830*a*, may transfer communication from BS 815*a* to AP 810*a* while maintaining continuous communication with a network, such as network 850.

Figure 13A:
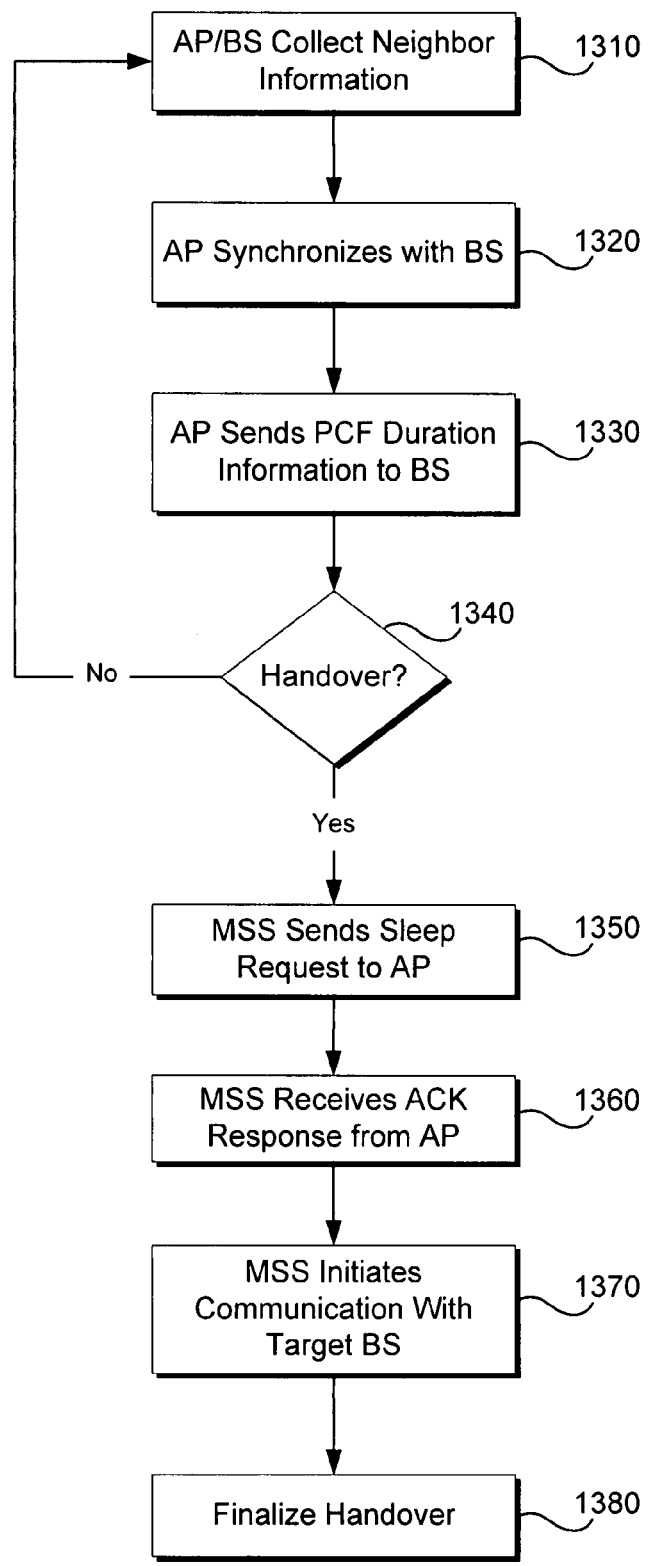
FIG. 13*a* is a flow chart illustrating an exemplary handover from a Wi-Fi network to a Wi-Max network, consistent with certain disclosed embodiments.
Figure 13B:
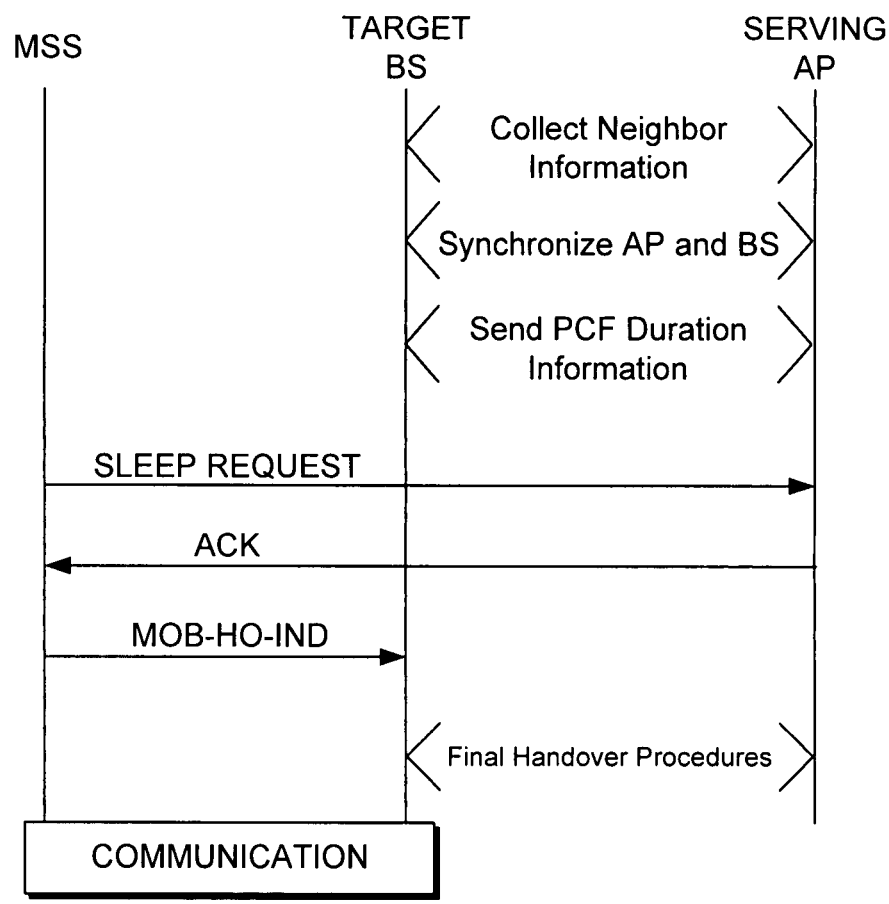
FIG. 13*b* is a signaling diagram of an exemplary exchange of data in a handover from a Wi-Fi network to a Wi-Max network, consistent with certain disclosed embodiments.

FIGS. 13*a* and 13*b* illustrate an exemplary process for a transfer of communication from AP 810 to BS 815 in which handover is initiated by MSS 830. More particularly, FIG. 13*a* illustrates an exemplary flowchart of a handover from a Wi-Fi network to a Wi-Max network, and FIG. 13*b* is a signaling diagram of an exemplary exchange of data in a handover from a Wi-Fi network to a Wi-Max network. The process of FIGS. 13*a* and 13*b* may be, performed by one or more components of AP 810, BS 815, SS 820, and MSS 830. For example, AP 810, BS 815, SS 820, and MSS 830 may execute one or more software programs that may perform one or more of the process steps of FIGS. 13*a* and 13*b*. In this illustration, communication is initially established between MSS 830*a* and AP 810*a*, and MSS 830*a* may initiate handover from AP 810*a* to BS 815*a*.

Referring to FIG. 13*a*, AP 810*a* and BS 815*a* may periodically collect information regarding neighboring APs 810 and BSs 815 (step 1310). The collection of neighboring information may be made by polling, probe requests, signal detection, etc. In one exemplary embodiment, TCP/IP routing packets may be exchanged by means of a wired communication network connecting APs 810 and BSs 815. For example, information may be obtained from TCP/IP routing packets exchanged between APs 810 and BSs 815, such as, for example, a number of hops, an IP segment, etc. A hop may be an intermediate connection (e.g., router, switch, hub, etc.) in a string of connections (e.g., router, switch, hub, etc.) linking two devices (e.g., AP 810*a* and BS 815*b*). Thus, for example, when there is one intermediate connection between AP 810 and BS 815, there may be only one hop, when there are two intermediate connections between AP 810 and BS 815, there may be two hops, and so on. When the number of hops is equal to or less than a predetermined number (e.g., one or two hops), it may be determined that the sending and receiving APs 810 and BSs 815 are neighbors. Alternatively and/or additionally, APs 810 and BSs 815 connected in the same IP segment may also be determined to be neighbors. In another exemplary embodiment, neighbor information may be stored in APs 810 and BSs 815 through a manual process at, for example, installation, initial setup, tear-down, upgrade, maintenance, etc. For example, neighboring information may be entered through a keyboard, copied or downloaded from a file, etc. The collected neighboring information may be stored by AP 810*a* and BS 815*a* in memory for later use.

AP 810*a* may use Network Timing Protocol (NTP) for periodic synchronization with BS 815*a* (step 1320). In one exemplary embodiment, this may include synchronizing the beacon frame start time of AP 810*a* with a downlink subframe start time of BS 815*a*. NTP is a protocol for synchronizing the clocks of computer systems, the details of which are well-known in the art and will not be discussed further.

Additionally, AP 810*a* may periodically send PCF and/or DCF duration information to BS 815*a* (step 1330). PCF and/or DCF duration information may be sent by means of a beacon frame (e.g., an 802.11 MAC frame in which the Type and Sub-Type fields are set to indicate a beacon frame). Each beacon frame may include a duration of the beacon frame and a duration of the PCF and/or DCF frame. In one exemplary embodiment, beacon frames may be broadcast by AP 810*a* and may be received by any AP 810 and/or BS 815 within a transmitting range. Alternatively and/or additionally, AP 810*a* may send beacon frames periodically to every BS 815 and AP 810 that has been determined to be a neighbor. In one exemplary embodiment, BS 815*a* may use the PCF and/or DCF duration information to coordinate a sleep interval, as is discussed in greater detail below. BS 815*a* may use the PCF and/or DCF duration information to coordinate a sleep interval as discussed in greater detail below.

MSS 830*a* may periodically evaluate communication with AP 810*a* to determine if handover should be made to target BS 815*a* (step 1340). The evaluation by MSS 830*a* may include, for example, a signal strength, a signal integrity, a signal frequency, or any other means known in the art. In one exemplary embodiment, MSS 830*a* may measure RSSI, CINR, and/or SNR of neighboring APs 810 and/or BSs 815. Neighboring APs 810 and BSs 815 may be determined using a database containing neighboring information received and stored by MSS 830*a*. When MSS 830*a* determines that the measured RSSI, CINR, and/or SNR value for the serving AP 810*a* is greater than, less than, and/or equal to a predetermined threshold value, depending on the measurement used, MSS 830*a* may send a handover request to serving AP 810*a*. For example, when MSS 830*a* determines that the measured RSSI value for AP 810*a* is less than a predetermined threshold value, MSS 830*a* may send a handover request to serving AP 810*a*. In one exemplary embodiment, the handover request may include a priority list of BSs 815. The priority list of BSs 815 may be based on the measured signal values and/or neighboring information stored by MSS 830*a*. If it is determined that handoff will not occur (step 1340, No), APs 810 and BSs 815 may continue periodic collection, synchronization, and communication as discussed above with respect to steps 1310, 1320, and 1330.

When MSS 830*a* makes a determination to commence handover from AP 810*a* to BS 815*a* (Step 1340, Yes), MSS 830*a* may send a message to AP 810*a* (step 1350). The message may include, for example, a "sleep request." In one exemplary embodiment, the "sleep request" may specify a certain duration for the sleep, or sleep interval, start frame of the sleep interval, power saving class, etc. In response, AP 810*a* may send a message to MSS 830*a* to confirm the action (step 1360). In one exemplary embodiment, the message may include, for example, an "ACK" or "sleep confirm."

While communication between MSS 830*a* and AP 810*a* is idle, MSS 830*a* may begin activation of BS 815*a* (step 1370) without interference. Activation may include transmission of an MOB_HO_IND message from MSS 830*a* to BS 815*a* (step 1370). As with a Wi-Max to Wi-Max handover, once MSS 830*a* has sent the MOB_HO_IND message to BS 815*a*, MSS 830*a* may begin handover operations with BS 815*a* (step 1380). In one exemplary embodiment, MSS 830*a* may adjust its operating frequency if BS 815*a* operates at a different frequency than AP 810*a*. In addition, MSS 830*a* may synchronize frames with BS 815*a*. Further, if handover is successful, AP 810*a* may release its connection with MSS 830*a* and either AP 810*a* or BS 815*a* may update the network to indicate that BS 815*a* is serving MSS 830*a*.

In this manner, wireless communication devices that operate according to both the 802.11 and 802.16 families of standards, such as MSS 830*a*, may transfer communication from AP 810*a* to BS 815*a* while maintaining continuous communication with a network, such as network 850.

The disclosed embodiments may be implemented within any network configuration utilizing the 802.11 and 802.16 families of standards. The disclosed embodiments may achieve improved performance. In particular, the disclosed embodiments may reduce signal interference associated with transfer of communication in dual-mode 802.11- and 802.16- based networks.

It will be apparent to those skilled in the art that various modifications and variations can be made in the system and method for reducing signal interference in communication networks. It is intended that the standard and examples be considered as exemplary only, with a true scope of the disclosed embodiments being indicated by the following claims and their equivalents.

What is claimed is:

1. A method for wireless communication, comprising:

determining, for a client device having a first wireless connection with a first connection point, to initiate a second wireless connection between the client device and a second connection point, wherein the first connection point includes an Access Point and the second connection point includes a Base Station;

sending a message from the second connection point to the first connection point, the message including instructions for the first connection point to communicate with the client device using either a Point Coordinate Function (PCF) or a Distributed Coordinate Function (DCF); and initiating the second wireless connection between the client device and the second connection point, wherein the method further includes receiving, at the second connection point, data from the client device during one or more periods of idle communication between the client device and the first connection point, the one or more periods of idle communication being determined based on the PCF or the DCF.

2. The method as in claim 1, wherein initiating the second wireless connection further includes:

receiving, at the second connection point, an MOB_HO_IND message from the client device.

3. The method as in claim 1, further including:
releasing the first wireless connection between the client device and the first connection point.

4. The method as in claim 1, further including:
synchronizing timing between the first connection point and the second connection point.

5. The method as in claim 1, wherein transmission and reception of data for the Access Point is based on IEEE 802.11.

6. The method as in claim 1, wherein transmission and reception of data for the Base Station is based on IEEE 802.16.

7. A wireless communication station for wireless communication, the wireless communication station comprising:
at least one memory to store data and instructions; and
at least one processor configured to access the memory and configured to, when executing the instructions:
determine to initiate a wireless connection between a client device and the wireless communication station, wherein the client device is currently connected with a wireless communication point;
send a message from the wireless communication station to the wireless communication point, wherein the message includes instructions for the wireless communication point to communicate with the client device using either a Point Coordinate Function (PCF) or a Distributed Coordinate Function (DCF); and
initiate the wireless connection between the client device and the wireless communication station,
wherein the at least one processor is further configured to execute instructions to receive, by the wireless communication station, data from the client device during one or more periods of idle communication between the client device and the wireless communication point, the one or more periods of idle communication being determined based on the PCF or the DCF.

8. The wireless communication station as in claim 7, wherein the at least one processor is further configured to execute instructions to receive, by the wireless communication station, an MOB_HO_IND message from the client device.

9. The wireless communication station as in claim 7, wherein the at least one processor is further configured to execute instructions to synchronize timing between the wireless communication station and the wireless communication point.

10. The wireless communication station as in claim 7, wherein transmission and reception of data for the wireless communication point is based on IEEE 802.11.

11. The wireless communication station as in claim 7, wherein transmission and reception of data for the wireless communication station is based on IEEE 802.16.

* * * * *